US009957973B2

(12) United States Patent
Iliopoulou

(10) Patent No.: US 9,957,973 B2
(45) Date of Patent: May 1, 2018

(54) BLADE WITH AN S-SHAPED PROFILE FOR AN AXIAL TURBOMACHINE COMPRESSOR

(71) Applicant: Techspace Aero S.A., Herstal (Milmort) (BE)

(72) Inventor: Vasiliki Iliopoulou, Winksele (BE)

(73) Assignee: Safran Aero Boosters SA (BE)

(*) Notice: Subject to any disclaimer, the term of this patent is extended or adjusted under 35 U.S.C. 154(b) by 1517 days.

(21) Appl. No.: 13/894,456

(22) Filed: May 15, 2013

(65) Prior Publication Data

US 2014/0356154 A1     Dec. 4, 2014

(30) Foreign Application Priority Data

Jun. 1, 2012 (EP) .................................... 12170536

(51) Int. Cl.
| F04D 29/38 | (2006.01) |
| F04D 29/54 | (2006.01) |
| F01D 5/14 | (2006.01) |
| F04D 29/32 | (2006.01) |

(52) U.S. Cl.
CPC .......... *F04D 29/384* (2013.01); *F01D 5/141* (2013.01); *F04D 29/324* (2013.01); *F04D 29/544* (2013.01); *F05D 2250/38* (2013.01); *F05D 2250/70* (2013.01); *F05D 2250/75* (2013.01); *Y02T 50/673* (2013.01)

(58) Field of Classification Search
CPC ...... F04D 29/384; F04D 29/544; F01D 5/141; F05D 2250/38
See application file for complete search history.

(56) References Cited

U.S. PATENT DOCUMENTS

| 7,484,937 | B2 | 2/2009 | Johann | |
| 7,946,826 | B1* | 5/2011 | Koegler | F03D 1/0633 |
| | | | | 416/238 |
| 2006/0210395 | A1* | 9/2006 | Schuster | F01D 5/141 |
| | | | | 415/208.1 |
| 2008/0286107 | A1* | 11/2008 | Clemen | F01D 5/141 |
| | | | | 416/223 A |

(Continued)

FOREIGN PATENT DOCUMENTS

| EP | 1953341 A2 | 8/2008 |
| WO | 2009103528 A2 | 8/2009 |

OTHER PUBLICATIONS

European Search Report from corresponding application EP 12170536.2 dated Aug. 2, 2012.

*Primary Examiner* — Jason Shanske
*Assistant Examiner* — Jesse Prager
(74) *Attorney, Agent, or Firm* — Sandberg Phoenix von Gontard P.C.

(57) ABSTRACT

The present disclosure provides a subsonic rotor and/or stator blade profile of an axial turbomachine compressor, such as a turbojet. The blade comprises a leading edge with an S-shaped lateral profile in its mid-plane. Specifically, the profile includes, from its inner end to the outer end, a first convex portion including the foremost point of the blade, and a second concave portion including the rearmost area of the blade. This profile enables the fluid flow between 20% and 80% of the blade's length to be redistributed. This so-called "sweep" profile increases the performance of the stage with such blades because it reduces blade tip vortex losses as well as secondary losses.

14 Claims, 3 Drawing Sheets

(56) References Cited

U.S. PATENT DOCUMENTS

| | | | |
|---|---|---|---|
| 2009/0123276 A1* | 5/2009 | Greim | F01D 5/141 415/193 |
| 2009/0304518 A1* | 12/2009 | Kodama | F01D 5/141 416/223 R |
| 2010/0215503 A1 | 8/2010 | Myoren et al. | |
| 2010/0232970 A1* | 9/2010 | Murooka | F01D 5/141 416/223 A |
| 2012/0076646 A1* | 3/2012 | Ono | F01D 5/141 415/181 |
| 2013/0224040 A1* | 8/2013 | Straccia | F01D 5/141 416/242 |
| 2013/0323065 A1* | 12/2013 | Murooka | F01D 5/141 416/219 R |

* cited by examiner

BLADE WITH AN S-SHAPED PROFILE FOR AN AXIAL TURBOMACHINE COMPRESSOR

CROSS-REFERENCE TO RELATED APPLICATIONS

This application claims the benefit, under 35 U.S.C. § 119, of EP 12170536.2, filed Jun. 1, 2012, the disclosure of which is incorporated herein by reference in its entirety.

FIELD

The invention relates to the field of axial turbomachines, more particularly to the compressors of such machines. The invention relates to the blades of such machines.

BACKGROUND

The statements in this section merely provide background information related to the present disclosure and can not constitute prior art.

WO 2009/103528 A2 discloses different blade geometries for axial turbomachines, including compressors of axial turbomachines. It discloses in particular a geometry in which the blade's leading edge has a sinusoidal S-shaped profile. This interpretation combines blade profiling across its overall section (or its chord) as well as perpendicular to it. In other words, this interpretation combines both so-called "sweep" and "lean" profiles respectively. The so-called "sweep" profile is along its length by a "displacement" of the section in a direction along its axial chord. The "displacement" mentioned above is essentially an offset in a given direction of the stack of blade sections along its length, the offset possibly changing direction. The so-called "lean" profile is along its length by a "displacement" of the section in a direction perpendicular to that of its axial chord. This combination of geometry has been shown as being able to reduce secondary vortices, leakage losses and shock losses. It should be noted that the shock losses cannot, in principle, affect the compressor blades of low-pressure turbomachines but only the fan and those of the transonic compressor upstream of the combustion chamber, or the turbine blades downstream of the combustion chamber. This interpretation does not suggest any exact blade profile parameters and, moreover, does not detail the precise effect of each of the profiling mechanisms disclosed.

U.S. Patent Application No. 2010/0215503 A1 discloses a "sweep" blade profile for transonic or supersonic applications. This interpretation focuses on reducing the combined shock losses to maintain the blade's integrity. It identifies that profiling towards the front of the blade ("forward sweep") causes stress concentration at the leading edge at the blade root; this stress concentration is primarily due to the blade's center of gravity being shifted forwards. To solve this problem, this interpretation provides a "sweep" profile towards the back at the outer part of the blade to compensate for the shift in the center of gravity.

In the case of subsonic applications, such as those found in boosters, including low-pressure compressors of axial turbomachines, flow losses are virtually nonexistent. However, other types of losses are present; these include vortex losses generated by rotor blade tip leakage as well as secondary losses associated with the fluid flow along the inner and outer walls of the fluid stream.

SUMMARY

The invention provides a blade geometry that overcomes at least one of the problems mentioned above. More particularly, the invention provides a blade geometry for subsonic applications able to reduce aerodynamic losses due, especially, to the fluid flow along the blade.

The invention relates to a subsonic blade of an axial turbomachine intended to be located radially on the machine comprising a leading edge and a trailing edge, two aerodynamic surfaces opposite to each other, extending over the length of the blade and connecting the leading edge to the trailing edge with the leading edge having a lateral profile that is S-shaped, wherein the foremost part of the leading edge is at a position comprised between 3% and 20% of the blade length, and/or the rearmost part of the leading edge is at a position comprised between 85% and 97% of the blade length.

The blade profile under consideration is that laterally in the mid-plane of the blade.

The blade length is the length of its aerodynamic part, that is to say, regardless of its means of fixing.

The foremost and/or rearmost parts can be pointed or almost straight.

The terms "foremost" and "rearmost" are to be interpreted in relation to the main direction of fluid flow across the blade aerofoils.

According to an advantageous embodiment of the invention, the foremost part of the leading edge is at a position comprised between 5% and 17% of the length of the blade, for example between 7% and 15% of the length of the blade, and/or the rearmost part of the leading edge is at a position comprised between 87% and 95% of the blade length, for example between 90% and 95% of the blade length.

According to another advantageous embodiment of the invention, the profile of the leading edge comprises, from its inner end to its outer end, a first convex portion containing the foremost part, and a second concave portion containing the rearmost part.

According to yet another advantageous embodiment of the invention, the first and/or second part of the leading edge is at a maximum distance from a straight line passing through the inner and outer ends of the leading edge that is between 5 and 15% of the corresponding blade chord length. The chord length is the axial length of the chord along a direction perpendicular to the blade's main axis, and/or in the direction of fluid flow along the aerodynamic surfaces.

The first and second sections of the leading edge are such that their respective maximum distances from the straight line passing through the inner and outer ends of the leading edge do not differ by more than 40%, for example 30%, or for example 20% from each other.

According to still another advantageous embodiment of the invention, the leading edge profile includes an area or a point of inflection between the first and second sections, the area or point being between 40% and 60%, for example between 45% and 55% along the length of the blade.

According to still yet another advantageous embodiment of the invention, the profile of the leading edge comprises or corresponds to a polynomial function passing through the inner and outer ends of the edge and through a point or the point of the foremost area and a point or the point of the very rearmost area.

According to another advantageous embodiment of the invention, the profile of the leading edge comprises or includes or a Bezier function or B-spline defined with respect to the inner and outer ends of the edge, and through a point or the point of the foremost area and a point or the point of the very rearmost area.

According to yet another advantageous embodiment of the invention, the trailing edge has a profile generally parallel to the leading edge, the distance between the edges not varying by more than 10%, for example 5%.

According to still another advantageous embodiment of the invention, the length of the foremost part of the leading edge is longer, for example by 50%, of the total length of the blade less the length of the rearmost part of the leading edge.

According to still yet another advantageous embodiment of the invention, the slope of the leading edge at its outer end is greater, fore example by 20%, or for example by 35%, or for example by 50% than the slope of the profile at its inner end.

According to another advantageous embodiment of the invention, the maximum slope of the leading edge profile lies between the rearmost part of the profile and its outer end.

According to yet another advantageous embodiment of the invention, the leading edge and/or trailing edge is/are lie in a plane corresponding to the mid-plane of the blade, and that within a tolerance of 10%, for example 5%, or for example 1% of the length of the blade.

The invention also relates to an axial turbomachine compressor, comprising a rotor with at least one rotor blade stage and a stator with at least one stator blade stage, wherein the blades of at least one of the rotor and stator stages are in accordance with the invention.

The invention also relates to an axial turbomachine, such as a jet engine, comprising a compressor wherein the compressor is in accordance within the invention.

The invention permits an increase in the efficiency of the engine in which the blades are implemented by reducing blade tip vortex losses as well as a reduction in secondary losses. The so-called "sweep" profile of the invention can generate radial velocity components in the fluid along the blade, especially at the leading edge. These radial components can redistribute the fluid flow over that portion of the blade comprising substantially between 20% and 80% of its length.

The particular profile of the leading edge, especially its asymmetry, enables the flow across the central part of the blade to be optimally redistributed.

Further areas of applicability of the present teachings will become apparent from the description provided herein. It should be understood that the description and specific examples are intended for purposes of illustration only and are not intended to limit the scope of the present teachings.

DRAWINGS

The drawings described herein are for illustration purposes only and are not intended to limit the scope of the present teachings in any way.

Figure 4:
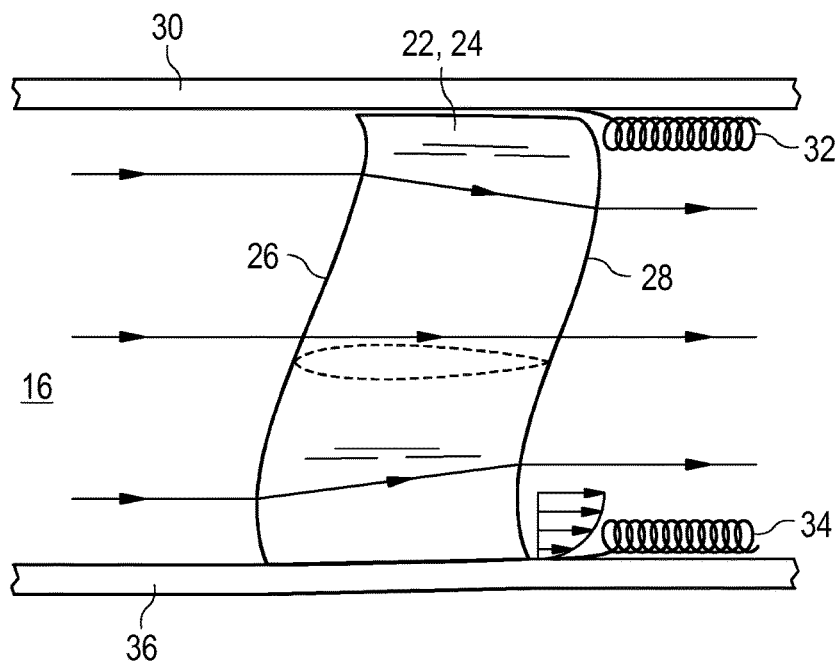
FIG. 4 is a sectional view of a blade in accordance with various embodiment of the invention.
Figure 5:
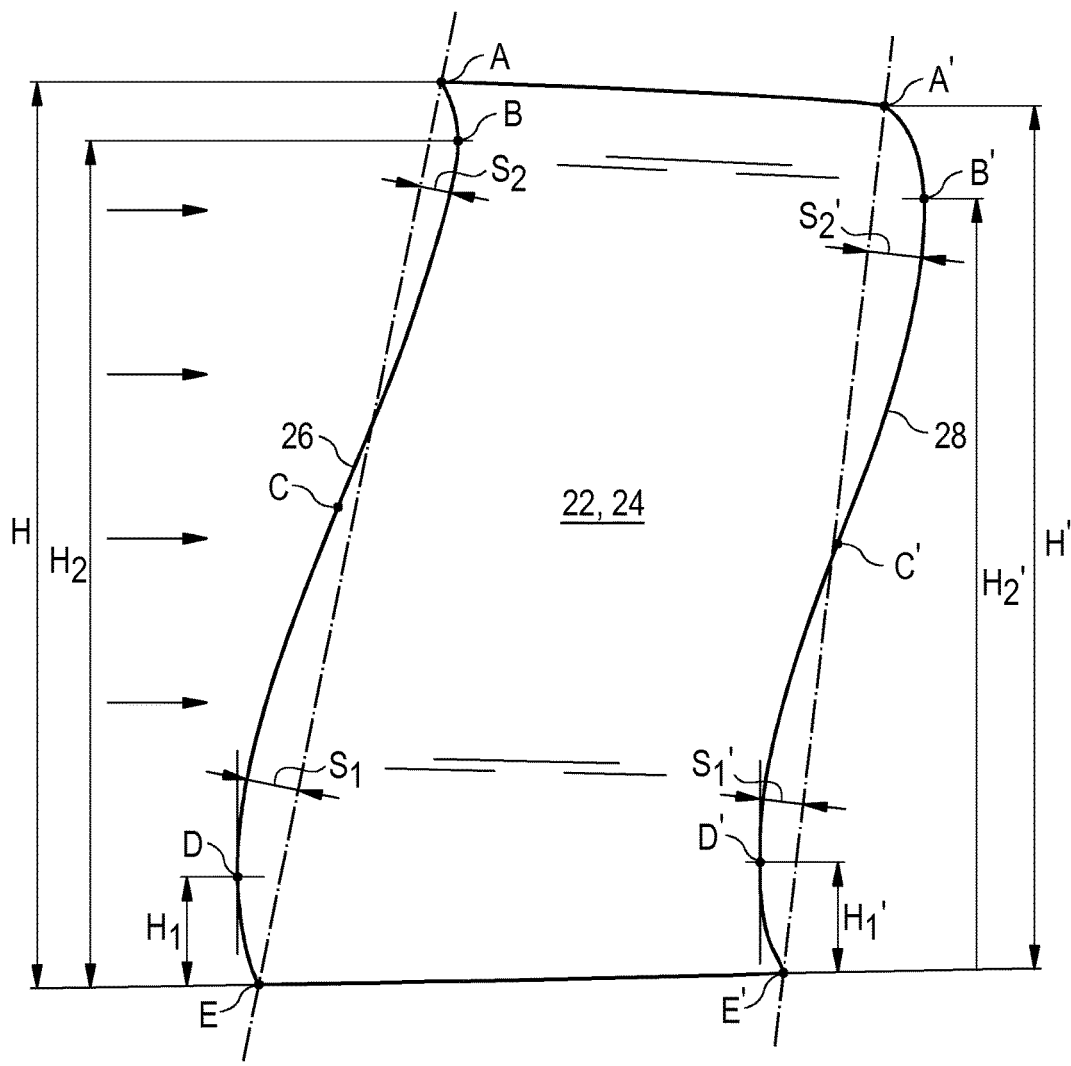

FIG. 5 an enlarged view of the blade profile in FIG. 4, illustrating its geometry, in accordance with various embodiments of the invention.

Corresponding reference numerals indicate corresponding parts throughout the several views of drawings.

DETAILED DESCRIPTION

The following description is merely exemplary in nature and is in no way intended to limit the present teachings, application, or uses. Throughout this specification, like reference numerals will be used to refer to like elements.

Figure 1:
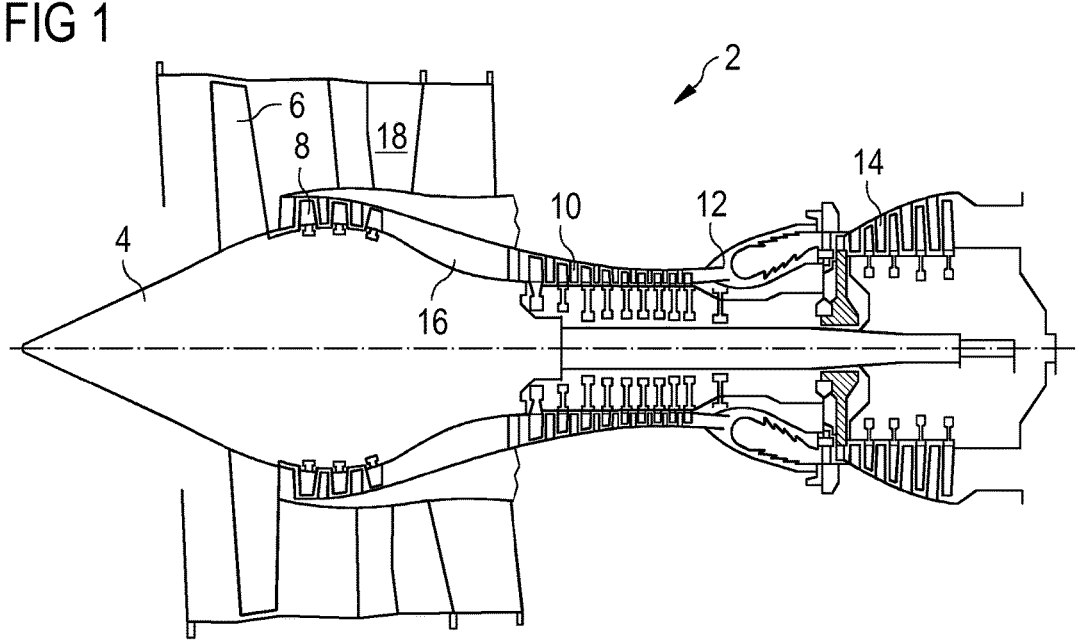
FIG. 1 is a schematic illustration of an axial turbomachine, in accordance with various embodiments of the invention.

FIG. 1 illustrates schematically an axial turbomachine 2. In this case it is a double-flow turbojet. The turbojet 2 consists essentially of a first compressor stage, called a low-pressure compressor 8, a second compressor stage, called a high pressure compressor 10, a combustion chamber 12 and one or more turbine stages 14. In operation, the mechanical power of the turbine 14 is transmitted through the central shaft to the rotor 4 and drives the two compression stages 8 and 10. The low and high pressure compressors 8 and 10 include a plurality of rotor blade rows associated with stator blade rows. The rotation of the rotor 4 thus generates a flow of air and progressively compresses it up to the entrance of the combustion chamber 12. An inlet fan commonly called a turbofan 6 is coupled to the rotor 4 and generates an air flow which is divided into a primary flow 16 passing through the different stages of the turbomachine mentioned above and a secondary flow 18 passing through an annular passage (shown in part) running the length of the machine which then rejoins the main flow at the turbine outlet.

The amount of air bypassing the engine varies, depending on the engine. It is greater if the engine is designed to fly at low speeds. This proportion is called the bypass ratio, the ratio of the cold mass flow (called secondary) to the hot mass flow (called primary). Military engines optimized for supersonic flight can reach a bypass ratio below 1, while aircraft engines for airliners, optimized for cruising at around Mach 0.8, have bypass ratios of between 5 and 10. Such engines derive most of their thrust from the cold flow (80%), the hot stream representing 20% of the thrust.

Figure 2:
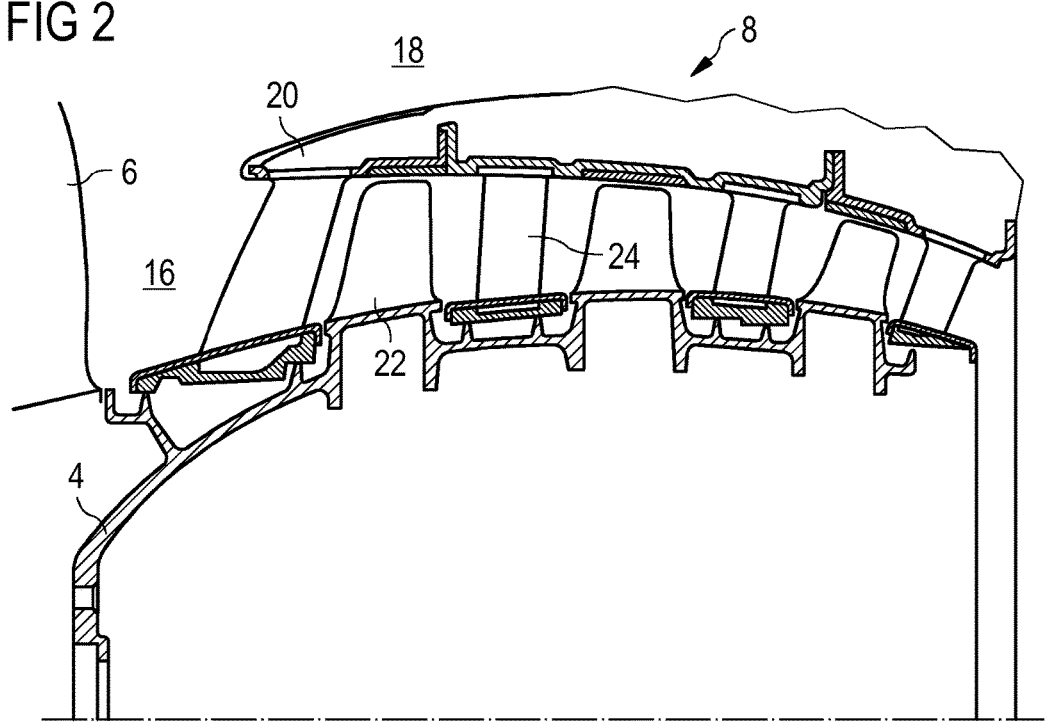
FIG. 2 is a sectional view of a low-pressure compressor section of an axial turbomachine such as that in FIG. 1, in which the blades of the invention could be used, in accordance with various embodiments.

FIG. 2 is a sectional view of a low-pressure compressor 8 of an axial turbomachine 2 such as that of FIG. 1. The diagram shows a portion of the inlet fan or turbofan 6 and the flow splitter nose 20 separating the primary flow 16 and the secondary flow 18. The rotor 4 includes several rows of rotor blades 22. The housing supports several rows of stator blades 24. Each pair of rotor and associated stator blade rows forms one compressor stage of the compressor 8.

Figure 3:
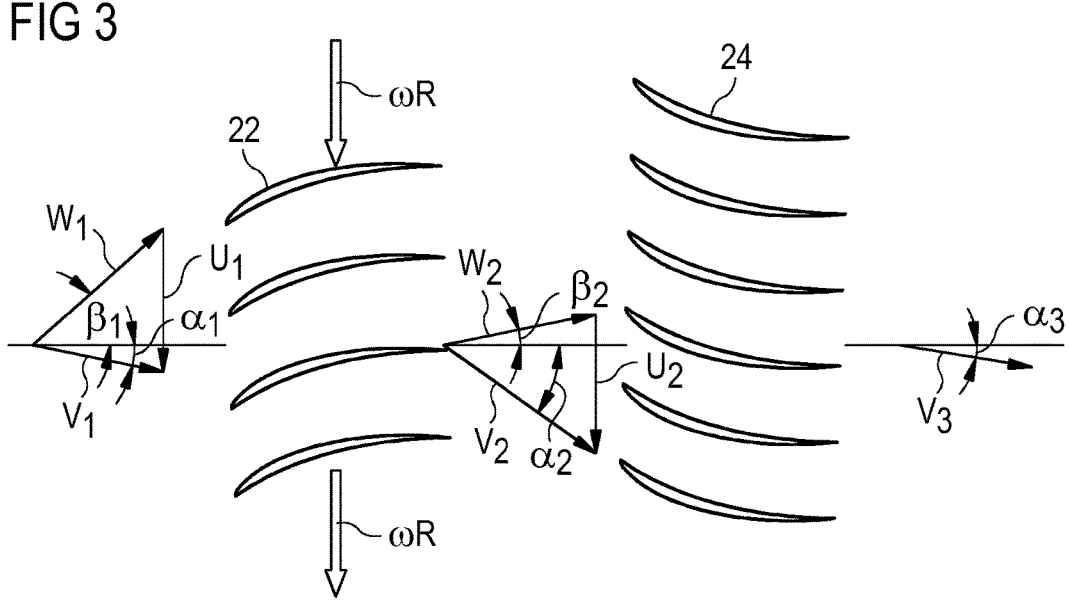
FIG. 3 is a diagram showing the rotor and stator blades of one stage of axial compressor as well as vector diagrams of the fluid velocities, in accordance with various embodiments of the invention.

FIG. 3 shows velocity vector diagrams for the fluid passing through a compressor stage. The rotor stage 22 accelerates the fluid flow resulting from the energy transmitted by the transmission shaft. The stator stage 24 converts the kinetic energy into pressure because of the shape of the stator. The vector diagram to the left of the rotor stage 22 corresponds to the fluid entering the stage. The vector $U_1=\omega R$ corresponds to the rotational speed of the rotor blades 22. The vector $W_1$ is the relative rotor entry velocity of the fluid and the vector $V_1$ is the absolute rotor entry velocity of the fluid, and is the vector sum of the vectors $U_1$ and $W_1$. The vector diagram to the right of the rotor stage 22 corresponds to the fluid leaving the stage. Vector $U_2$, the rotational speed of the rotor blades 22, is identical to vector $U_1$. It can be seen that the fluid is accelerated, the output vector $V_2$ being substantially longer than the input vector $V_1$. It can also be seen that the change in direction of vector $W_1$ generates a change in direction of the fluid exit velocity vector $V_2$. The exit angle $\alpha_2$ is substantially larger than the entry angle $\alpha_1$. The output vector $V_2$ is then substantially in the same direction as the leading edge angle of the stator blades 24. The stator blades 24 deflect and decelerate the accelerated fluid and this deceleration is converted into a pressure increase. The stator exit velocity $V_3$ is smaller and at a narrower angle $\alpha_3$.

In the following description, the terms "external(s)" and "internal(s)" will be used to describe the position of components in the fluid stream. These terms refer to the generally circular cross section of the fluid stream; "external(s)" refers to a position farther from the center of the circle, i.e. the axis of rotation of the machine, and "internal(s)" refers to a position that is nearer to the center.

FIG. 4 shows a blade in accordance with the invention and its effect on the flow. This can be either a rotor or a stator blade 22 or 24. FIG. 4 shows a rotor blade 22. Its "sweep" profile, that is to say relative to the stacking of its section in a direction substantially corresponding to its chord, is clearly visible. It can be seen that that the leading edge 26 and the trailing edge 28 both have a similar S-shaped profile. The S-shaped profile is such that the inner half of the leading edge is convex and the outer half is concave. The leading edge profile and the body of the blade have the effect of generating a radial velocity component in the fluid stream bounded by the inner wall 36 and the outer wall 30. This component is generated primarily for the fluid moving near the walls, the objective being to remove the moving fluid from the walls 30 and 36. The concentration of the fluid flow in the stream reduces losses due to blade tip leakage vortices. These losses are mainly a result of the mechanical clearance between the rotor blade 22 tips and the corresponding stator wall 30. The losses are illustrated by the vortex 32 arising from the mechanical clearance between the blade 22 tip and the wall 30.

Concentrating the fluid flow in the stream can also reduce secondary losses related to the velocity gradient along the fixed walls 30 and 36. This is illustrated for the wall 36. It generates vortices 34 which constitute so-called secondary losses. These losses are normally present on the inner wall 36 and the outer wall 30.

FIG. 5 illustrates in more detail the blade profile 22, 24. The leading edge 26 is characterized by a number of different points. Point A is at the outer end of the blade tip. Point B is the most downstream point. Point D is the furthest upstream and Point E is the inner end of the leading edge 26, at the blade root. Point C is a point of inflection between the convex inner portion and the outer concave portion. It is where the leading edge 26 changes curvature.

The leading edge 26 has length H. Point D is at a distance $H_1$ and Point B is at a distance $H_2$. $H_1$ is between 3% and 20% of the total length H. $H_2$ is between 85% and 97% of the total length H. As can be seen in the figure, Point B is closer to the outer end at Point A than Point D is to the inner end at Point E.

The amplitudes of the convex portion C-D-E and the concave portion C-B-A of the leading edge 26 can be expressed by the distances $S_1$ and $S_2$, respectively, compared to a straight line passing through Points A and E. These distances are preferably between 5% and 15% of the average width of the blade 22, 24.

The profile of the leading edge 26 can be a polynomial function passing through the points A, B, D and E, preferably of degree greater than or equal to 3. The profile of the leading edge 26 can also be a Bezier function or B-spline defined by the four points mentioned above.

The profile of the trailing edge 28 can be similar to that of the leading edge 26 in particular because of spatial constraints and when the stator and rotor blades 24 and 22 are in accordance with the invention.

The parameters characterizing the leading edge 26 profile are also applicable to the trailing edge 28. The same letters are used to characterize these letters and are distinguished from those of the leading edge 26 by adding a prime symbol ('). All the description above regarding the leading edge 26 are also applicable to the trailing edge 28.

The increase in performance provided by the design of the invention compared with an already optimized stage is on the order of one percent or a few tenths of a percent.

The description herein is merely exemplary in nature and, thus, variations that do not depart from the gist of that which is described are intended to be within the scope of the teachings. Such variations are not to be regarded as a departure from the spirit and scope of the teachings.

What is claimed is:

1. A subsonic blade of an axial turbomachine located radially on the turbomachine, said blade comprising:
   a leading edge;
   a trailing edge; and
   two aerodynamic surfaces on opposite sides of the blade extending over a length of the blade with each surface joining the leading edge to the trailing edge, the leading edge having an S-shaped lateral profile, wherein at least one of:
      a foremost point of the leading edge is located a lateral distance from an inner end of the leading edge at a position between at least one of 3% and 20%, and 7% and 15% of the length of the blade; and
      a rearmost point of the leading edge is located a lateral distance from the inner end at a position between 85% and 97% of the length of the blade; and
      wherein the trailing edge has a profile generally parallel to the leading edge, a distance between the leading and trailing edges does not vary by more than at least one of 10%, and 5%.

2. The subsonic blade in accordance with claim 1 wherein at least one of:
   the foremost point of the leading edge is located a lateral distance from the inner end at a position between at least one of 5% and 17%, and 7% and 15% of the length of the blade; and
   the rearmost point of the leading edge is located a lateral distance from the inner end at a position between at least one of 87% and 95%, and 90% and 95%, of the length of the blade.

3. The subsonic blade in accordance with claim 1 wherein the profile of the leading edge comprises, from the inner end of the leading edge to an outer end of the leading edge, a convex first portion containing the foremost point, and a concave second portion containing the rearmost point.

4. The subsonic blade in accordance with claim 3, wherein at least one of the first and second portions of the leading edge is at a maximum distance from a straight line passing through the inner and outer ends of the leading edge that is between 5% and 15% of the corresponding length of the blade.

5. The subsonic blade in accordance with claim 3, wherein the leading edge profile includes an area of inflection between the first and second portions, the area of inflection being at a distance between at least one of 40% and 60%, and 45% and 55%, along the length of the blade from the inner end.

6. The subsonic blade in accordance with claim 3, wherein the profile of the leading edge corresponds to a polynomial function passing through the inner and outer ends of the leading edge and through the foremost point and the rearmost point.

7. The subsonic blade in accordance with claim 3, wherein the profile of the leading edge corresponds to a Bezier function defined with respect to the inner and outer ends of the leading edge through the foremost point and the rearmost point.

8. The subsonic blade in accordance with claim 1, wherein the lateral distance from the inner end to the foremost point is greater than the total length of the blade less the lateral distance from the inner end to the rearmost point by 50%.

9. The subsonic blade in accordance with claim 3, wherein a slope of the profile of the leading edge at the outer end is greater than the slope of the profile of the leading edge at the inner end by one of 20%, 35% and 50%.

10. The subsonic blade in accordance with claim 3 wherein a maximum slope of the leading edge profile lies between the rearmost point of the profile and the outer end.

11. The subsonic blade in accordance with claim 1 wherein at least one of the leading edge and the trailing edge lie in a plane corresponding to a mid-plane of the blade within a tolerance of at least one of 10%, 5% and 1% of the length of the blade.

12. An axial turbomachine compressor, comprising:
a rotor with at least one rotor blade stage; and
a stator with at least one stator blade stage,
wherein the blades of at least one of the rotor and stator stages comprise:
a leading edge;
a trailing edge; and
two aerodynamic surfaces on opposite sides of the blade extending over a length of the blade with each surface joining the leading edge to the trailing edge, the leading edge having an S-shaped lateral profile, wherein at least one of:
a foremost point of the leading edge is located a lateral distance from an inner end of the leading edge at a position between at least one of 3% and 20%, and 7% and 15% of the length of the blade; and
a rearmost point of the leading edge is located a lateral distance from the inner end at a position between 85% and 97% of the length of the blade;
wherein the profile of the leading edge comprises, from the inner end of the leading edge to an outer end of the leading edge, a convex first portion containing the foremost point, and a concave second portion containing the rearmost point; and
wherein a slope of the profile of the leading edge at the outer end is greater than the slope of the profile of the leading edge at the inner end by one of 20%, 35% and 50%.

13. Axial turbomachine comprising a compressor, wherein the compressor comprises:
a rotor with at least one rotor blade stage; and
a stator with at least one stator blade stage,
wherein the blades of at least one of the rotor and stator stages comprise:
a leading edge;
a trailing edge; and
two aerodynamic surfaces on opposite sides of the blade extending over a length of the blade with each surface joining the leading edge to the trailing edge, the leading edge having an S-shaped lateral profile, wherein at least one of:
a foremost point of the leading edge is located a lateral distance from an inner end of the leading edge at a position between at least one of 3% and 20%, and 7% and 15% of the length of the blade; and
a rearmost point of the leading edge is located a lateral distance from the inner end at a position between 85% and 97% of the length of the blade; and
wherein the trailing edge has a profile generally parallel to the leading edge, a distance between the leading and the trailing edges does not vary by more than at least one of 10% and 5%.

14. Axial turbomachine compressor according to claim 12, wherein the trailing edge has a profile generally parallel to the leading edge, a distance between the leading and trailing edges does not vary by more than at least one of 10%, and 5%.

* * * * *